United States Patent [19]

Ballach et al.

[11] 4,452,109

[45] Jun. 5, 1984

[54] LATHE FOR SIMULTANEOUS MACHINING OF TWO WORKPIECES

[75] Inventors: Reinhold Ballach; Dieter Kroll; Jürgen Rinn, all of Giessen, Fed. Rep. of Germany

[73] Assignee: Heyligenstaedt & Comp. Werkzeugmaschinenfabrik GmbH, Giessen, Fed. Rep. of Germany

[21] Appl. No.: 359,193

[22] Filed: Mar. 18, 1982

[30] Foreign Application Priority Data

Mar. 19, 1981 [DE] Fed. Rep. of Germany ....... 3110674

[51] Int. Cl.³ .................. B23B 3/34; B23B 19/02
[52] U.S. Cl. ................................ 82/3; 82/2 E
[58] Field of Search ...................... 82/2 E, 3

[56] References Cited

U.S. PATENT DOCUMENTS 4,270,420  6/1981  Tomlinson ........................... 82/3

FOREIGN PATENT DOCUMENTS 631262  11/1978  U.S.S.R. ............................ 82/2 E

Primary Examiner—W. D. Bray
Attorney, Agent, or Firm—Cantor and Lessler

[57] ABSTRACT

In a multi-spindle lathe, the centers of the spindles are arranged offset one above the other at right angles to the plane of the bed slide and the chucks are arranged offset in the longitudinal direction of the lathe. Each turret is fitted on a cross slide, the pivot axes of the turrets likewise running one above the other transversely of the plane of the bed slide, corresponding to the spindle centers. Due to these measures, the lathe is of relative small construction and offers the advantage that the cutting process can easily be observed and that there are no space problems as regards the turrets.

4 Claims, 2 Drawing Figures

LATHE FOR SIMULTANEOUS MACHINING OF TWO WORKPIECES

BACKGROUND OF THE INVENTION

This invention relates to a lathe for simultaneous machining of at least two workpieces and having at least two spindles with mutually parallel centers and at least two turrets. Such a lathe is described, for example, in Federal German Patentschrift 27 01 189.

In the lathes of the prior art, two spindles are arranged adjacently in the plane of the bed ways, or bed slides. Two carriers, constituted as turrets, are fitted at a spacing from the spindles on a single cross slide. This arrangement is disadvantageous in that the room for the turrets is relatively small, since there must be room between the two workpieces to be machined for the lower turret.

SUMMARY OF THE INVENTION

The object of the invention is to develop a lathe of the above kind in which there are no space problems as regards the turrets.

According to the invention, this object is achieved by simultaneous machining of at least two like workpieces and having at least two spindles with axes running mutually parallel and at least two turrets, wherein the axes of the spindles are arranged above each other, at right angles to the plane of the bed ways and the chucks arranged offset in the longitudinal direction, the lathe having at least two cross slides, each with a respective turret.

In the lathe according to the invention, the turrets are arranged adjacently in the longitudinal direction of the lathe and are only offset in height above the plane of the bed ways. Even when the turrets are very large, there is no danger that they will collide with the workpieces to be machined, since the spacing of each turret from the center not associated with it is larger in each case than that from the turning center of the workpiece to be machined.

Due to the axially offset arrangement of the spindles, a good view is given of the tools in use, since these are likewise offset in the longitudinal direction of the lathe. Apart from this, the spindles can be brought relatively close together, since the chucks of the spindles are offset corresponding to the spindles and hence do not mutually interfere.

It is also advantageous that the centers of gravity of the clamped workpieces are likewise offset. Hence the tool grippers of an automatic tool changer can reach simultaneously into the machine tool, so that they likewise do not mutually interfere. In practice, the lathe according to the invention will most likely be constructed as a two-spindle machine.

In a particularly advantageous embodiment of the invention, the cross-slides are arranged on separate bed slides. In this embodiment, the longitudinal and transverse position of the associated tool for each workpiece can be automatically corrected by travel along the associated bed slide and cross slide independently of the other. Hence additional guides and adjusting devices, which would be required with two tool systems arranged on one cross slide, are omitted. A further advantage of the two separate bed slides is that no mutual influence of the tools can take place, e.g., transmission of vibrations via a common cross slide.

It is also favorable if, according to a further embodiment of the invention, the turrets are mutually facing on the cross slide. By means of this, the tools can come very close to each other in the longitudinal direction of the lathe. Hence the spindles need be axially offset only a relatively small amount, so that the constructional length of the lathe according to the invention is only slightly increased as against the prior art lathe.

BRIEF DESCRIPTION OF THE DRAWINGS

The invention permits numerous possibilities of embodiment. An example of an embodiment is shown very diagrammatically in the drawing and will be described below.

DETAILED DESCRIPTION OF THE PREFERRED EMBODIMENT

Figure 1:
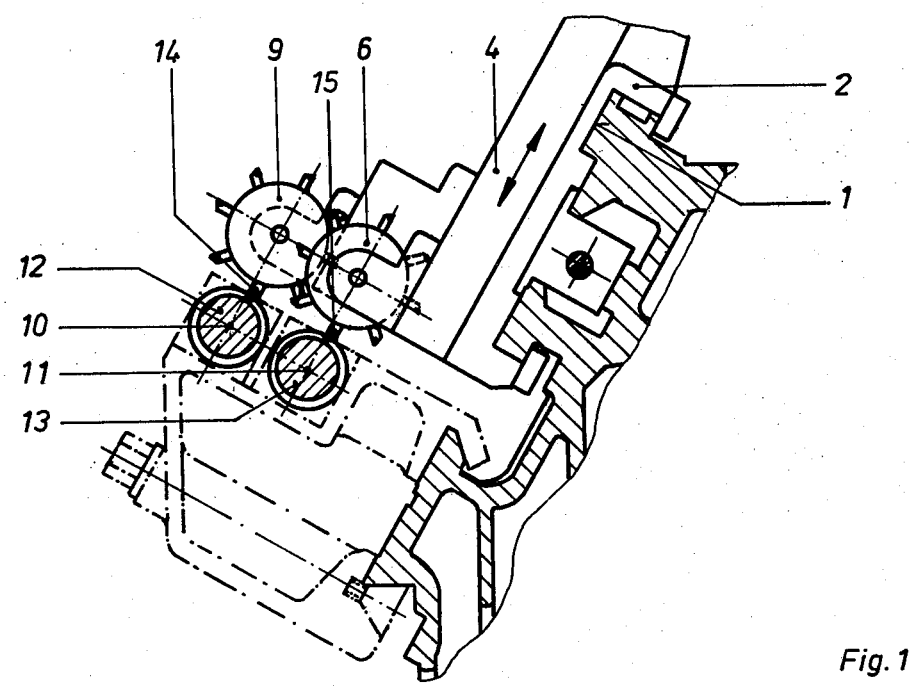
FIG. 1 is a cross sectional view through a part of the bed of a lathe, looking in the direction of the spindle box.
Figure 2:
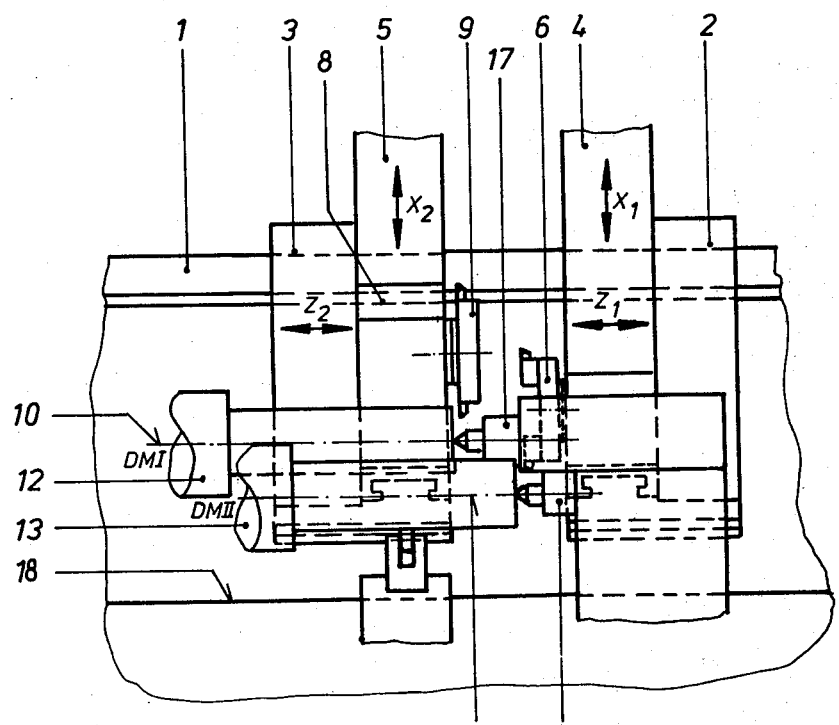
FIG. 2 is a front view of a part of the lathe according to the invention as in FIG. 1, in the region of the workpieces to be machined.

FIGS. 1 and 2 show a bed guide 1 of a lathe, on which are arranged, displaceably in the longitudinal direction of the lathe, bed slides 2 and 3. Respective cross slides 4 and 5 are arranged on each of the bed slides 2 and 3 and can travel on the bed slides, transversely thereof. The cross slide 4 carries a first turret 6 of conventional construction. The cross slide 5 carries a substructure 8 on which is fitted a second turret 9. This substructure 8 is of a height such that the turret 9 is located with its pivot axis on a line running transversely of the bed guide 1 and at a given distance from the pivot axis of the first turret 6. This mutual distance corresponds exactly to the spacing of two spindles whose centers are shown in the drawing by 10 and 11. These centers 10 and 11 are also located on a line perpendicular to the bed guide 1.

To illustrate the mode of operation of the lathe according to the invention, two shafts 12 and 13 to be machined are shown in the drawing. A respective tool 14 and 15 of each turret 6 and 9 is located immediately before being set in operation.

Although the chucks of the lathe cannot be seen in the drawings, it is seen in FIG. 2 that these must be axially offset relative to each other, since the workpieces 12 and 13 are offset.

For a better understanding of the overall arrangement, two tailstocks 16 and 17, which are likewise at an axial spacing from each other corresponding to the workpieces 14 and 15, are shown in FIG. 2. These tailstocks 16 and 17 are displaceable along a separate guide path 18.

What is claimed is:

1. A lathe for simultaneously machining at least two like workpieces comprising a bed guide, at least two bed slides displaceably mounted on said bed guide for longitudinal movement, at least two cross slides displaceably mounted on said bed slides for transverse movement, a turret mounted on each cross slide, at least two spindles whose axes of rotation are perpendicular to said bed guide and are mutually parallel, and a chuck carried by each spindle, said chucks being axially offset with respect to each other.

2. A lathe as claimed in claim 1, wherein each cross slide is mounted on a separate bed slide.

3. A lathe as claimed in claim 1 or 2, wherein the turrets face each other on the cross slides.

4. A lathe as claimed in claim 1 or 2, comprising two each of said bed guides, bed slides, cross slides, and spindles.

* * * * *